United States Patent
Hu

(10) Patent No.: US 11,580,971 B2
(45) Date of Patent: Feb. 14, 2023

(54) PHOTO ALBUM MANAGEMENT METHOD, STORAGE MEDIUM AND ELECTRONIC DEVICE

(71) Applicant: BOE TECHNOLOGY GROUP CO., LTD., Beijing (CN)

(72) Inventor: Fengshuo Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 265 days.

(21) Appl. No.: 16/840,716

(22) Filed: Apr. 6, 2020

(65) Prior Publication Data

US 2021/0065706 A1 Mar. 4, 2021

(30) Foreign Application Priority Data

Aug. 30, 2019 (CN) .......................... 201910816156.X

(51) Int. Cl.
*G10L 15/22* (2006.01)
*G06V 40/16* (2022.01)

(52) U.S. Cl.
CPC ............ *G10L 15/22* (2013.01); *G06V 40/165* (2022.01); *G06V 40/169* (2022.01); *G06V 40/172* (2022.01); *G10L 2015/223* (2013.01)

(58) Field of Classification Search
CPC ... G10L 15/22; G10L 2015/223; G10L 15/26; G06V 40/169; G06V 40/165; G06V 40/172
See application file for complete search history.

(56) References Cited

U.S. PATENT DOCUMENTS

| | | | |
|---|---|---|---|
| 2011/0276396 A1* | 11/2011 | Rathod | H04W 4/60 707/706 |
| 2015/0382047 A1* | 12/2015 | Van Os | H04N 21/41265 725/38 |
| 2016/0292494 A1* | 10/2016 | Ganong | G06V 40/172 |
| 2018/0046855 A1* | 2/2018 | Ganong | G06Q 30/02 |
| 2018/0247065 A1* | 8/2018 | Rhee | H04M 1/67 |
| 2019/0361978 A1* | 11/2019 | Ray | G10L 15/07 |
| 2020/0019759 A1* | 1/2020 | Savchenko | G06N 3/082 |
| 2020/0225908 A1* | 7/2020 | Lee | G06F 3/04886 |

(Continued)

FOREIGN PATENT DOCUMENTS

| | | |
|---|---|---|
| CN | 201523457 U | 7/2010 |
| CN | 102708185 A | 10/2012 |

(Continued)

OTHER PUBLICATIONS

First Office Action for CN Patent Application No. 201910816156.X dated Sep. 29, 2021.

*Primary Examiner* — Mark Villena
(74) *Attorney, Agent, or Firm* — Xsensus LLP

(57) ABSTRACT

The present disclosure provides a photo album management method. The method includes obtaining voice search information from a user, performing intent recognition on the voice search information to obtain an intent recognition result which indicates an intent of the user for a photo album, obtaining a voiceprint feature from the voice search information to determine identity information of the user, sending the intent recognition result and the identity information of the user, and opening the photo album according to the intent recognition result and the identity information.

14 Claims, 9 Drawing Sheets

(56) References Cited

U.S. PATENT DOCUMENTS

2021/0109703 A1\* 4/2021 Kim .................. H04M 1/725
2021/0149627 A1\* 5/2021 Jang .................. H04L 51/34

FOREIGN PATENT DOCUMENTS

| CN | 103984415 | A |   | 8/2014  |         |            |
|----|-----------|---|---|---------|---------|------------|
| CN | 105677799 | A |   | 6/2016  |         |            |
| CN | 106773742 | A |   | 5/2017  |         |            |
| CN | 107395846 | A |   | 11/2017 |         |            |
| CN | 109582882 | A |   | 4/2019  |         |            |
| CN | 109871460 | A |   | 6/2019  |         |            |
| CN | 110046305 | A |   | 7/2019  |         |            |
| WO | WO-2017044257 | A1 | \* | 3/2017 | ......... | G06F 16/3329 |

\* cited by examiner

{
A: {age: 65; face score: 66; long hair: 0; glasses: 1};
B: {age: 63; face score: 79; long hair: 0; glasses: 0};
C: {age: 37; face score: 77; long hair: 0; glasses: 0};
D: {age: 37; face score: 83; long hair: 1; glasses: 0};
E: {age: 6; face score: 51; long hair: 0; glasses: 0};
F: {age: 4; face score: 71; long hair: 1; glasses: 0};
}

PHOTO ALBUM MANAGEMENT METHOD, STORAGE MEDIUM AND ELECTRONIC DEVICE

CROSS-REFERENCE TO RELATED APPLICATION

The present disclosure claims the benefit of and priority to Chinese Patent Application No. 201910816156.X filed on Aug. 30, 2019, the contents of which being incorporated by reference in their entirety herein.

TECHNICAL FIELD

Embodiments of the present disclosure relate to terminal device display technologies and, in particular, relate to photo album management methods, a non-transitory computer-readable storage medium, and an electronic device.

BACKGROUND

Current intelligent speech devices are able to interact with users and support operations which may be conveniently conducted based on voice recognition technologies and natural language processing technologies. For example, intelligent albums can enable users to view album photos according to voice information input by a family member. However, current intelligent speech devices respond to family members in the same way. For example, intelligent albums or screens can only do the same for each member of a family, losing the personalization of push media and limiting extension of use scenarios.

In view of this, there is an urgent need in the art to develop a new photo album management method.

It should be noted that the information disclosed in the Background section above is only for enhancing the understanding of the background of the present disclosure and thus, may include information that does not constitute prior art known to those of ordinary skill in the art.

SUMMARY

According to a first aspect of the present disclosure, a photo album management method applied to a client is provided. The method includes:

obtaining voice search information from a user, and performing intent recognition on the voice search information to obtain an intent recognition result which indicates an intent of the user for a photo album;

obtaining a voiceprint feature from the voice search information to determine identity information of the user; and sending the intent recognition result and the identity information of the user, and opening the photo album according to the intent recognition result and the identity information.

According to an example embodiment, after opening the photo album according to the intent recognition result and the identity information, the method further includes:

receiving a target album image which is determined according to the intent recognition result; and displaying the target album image to the user.

According to an example embodiment, the target album image includes an album image having a target face attribute.

According to an example embodiment, performing intent recognition on the voice search information to obtain an intent recognition result, includes:

performing voice recognition processing on the voice search information to obtain text search information corresponding to the voice search information; and performing natural language understanding processing on the text search information to obtain the intent recognition result.

According to an example embodiment, before obtaining voice search information from the user, the method further includes:

obtaining voice information of one or more users whose voice information is to be uploaded, and extracting a voiceprint feature of the voice information;

obtaining at least one image and identity information of the one or more users whose voice information is to be uploaded, and associating the extracted voiceprint feature, the at least one image, and the identity information; and uploading the associated voiceprint feature, the at least one image, and the identity information.

According to an example embodiment, obtaining a voiceprint feature from the voice search information to determine identity information of the user, includes:

calculating voiceprint similarity information between the voiceprint feature obtained from the voice search information and at least one of voiceprint features of the one or more users; and if voiceprint similarity information between the voiceprint feature obtained from the voice search information and one of voiceprint features of the one or more users is greater than a first threshold, determining the one of voiceprint features as a target voiceprint feature, obtaining target identity information associated with the target voiceprint feature, and determining the target identity information as the identity information of the user who outputs the voice search information.

According to a second aspect of embodiments of the present disclosure, there is provided a photo album management method, applied to a server, wherein the method includes:

receiving an intent recognition result and identity information of a user who outputs voice search information, and determining a target user whose photos are to be viewed according to the intent recognition result and the identity information;

performing face recognition on a photo album using a face recognition algorithm to obtain a target album image of the target user; and sending the target album image to a client which displays the target album image.

According to an example embodiment, the intent recognition result includes a face attribute intent result which indicates what face attribute is desired;

the method further includes:

performing face attribute detection on the target album image to obtain a target album image with a target attribute that satisfies the face attribute intent result; and sending the target album image with the target attribute to the client so that the client displays the target album image with the target attribute before the user who outputs voice search information.

According to an example embodiment, performing face attribute detection on the target album image to obtain a target album image with a target attribute that satisfies the face attribute intent result includes:

performing the face attribute detection on the target album image to obtain target face attribute information that satisfies the face attribute intent result according to preset face attribute information; and determining a target album image including the target face attribute information as the target album image with the target attribute.

According to an example embodiment, the method further includes:

receiving identity information, voiceprint features, and at least one image which are respectively associated to one or more users and are uploaded by a client; and storing the received identity information, voiceprint feature, and at least one image.

According to an example embodiment, storing the identity information, voiceprint feature, and at least one image includes:

determining the received identity information as preset identity information associated with the one or more users and storing the identity information;

determining the voiceprint features respectively associated with the one or more users as preset voiceprint features and storing the voiceprint features; and determining the at least one image respectively associated with the one or more users as at least one preset image and storing the at least one image.

According to an example embodiment, determining the at least one image respectively associated with the one or more family members as at least one preset image and storing the image includes:

performing face attribute detection on the at least one preset image to obtain preset face attribute information; and associating the preset face attribute information with the at least one preset image and storing the preset face attribute information and the at least one preset image.

According to an example embodiment, the preset face attribute information includes preset head attribute information, preset face age information, preset face score information, and preset facial emotion information.

According to an example embodiment, the method further includes:

receiving a subsequently uploaded image, and matching the subsequently uploaded image against the at least one preset image;

obtaining a matched preset image, and obtaining preset face attribute information, preset identity information and a preset voiceprint feature associated with the matched preset image; and determining the preset face attribute information, the preset identity information and the preset voiceprint feature as the preset face attribute information, the preset identity information and the preset voiceprint feature associated with the subsequently uploaded image, and storing the preset face attribute information, the preset identity information, and the preset voiceprint feature.

According to a third aspect of embodiments of the present disclosure, a non-transitory computer-readable storage medium is provided having stored thereon a computer program, wherein when the computer program is executed by at least one hardware processor, the photo album management method according to any one of the above-described embodiments is implemented.

According to a fourth aspect of embodiments of the present disclosure, there is provided an electronic device, including:

at least one hardware processor; and a memory for storing program instructions executable by the at least one hardware processor;

wherein, when the program instructions are executed on the at least one hardware processor, the at least one hardware processor is directed to execute the photo album management method according to any one of the above-described embodiments.

BRIEF DESCRIPTION OF THE DRAWINGS

The drawings are incorporated in and constitute a part of the specification, illustrate embodiments consistent with the present disclosure, and together with the description serve to explain the principles of the present disclosure. Understandably, the drawings in the following description are just some example embodiments of the present disclosure. For those of ordinary skill in the art, other drawings can be obtained based on these drawings without creative efforts.

DETAILED DESCRIPTION

Figure 1:
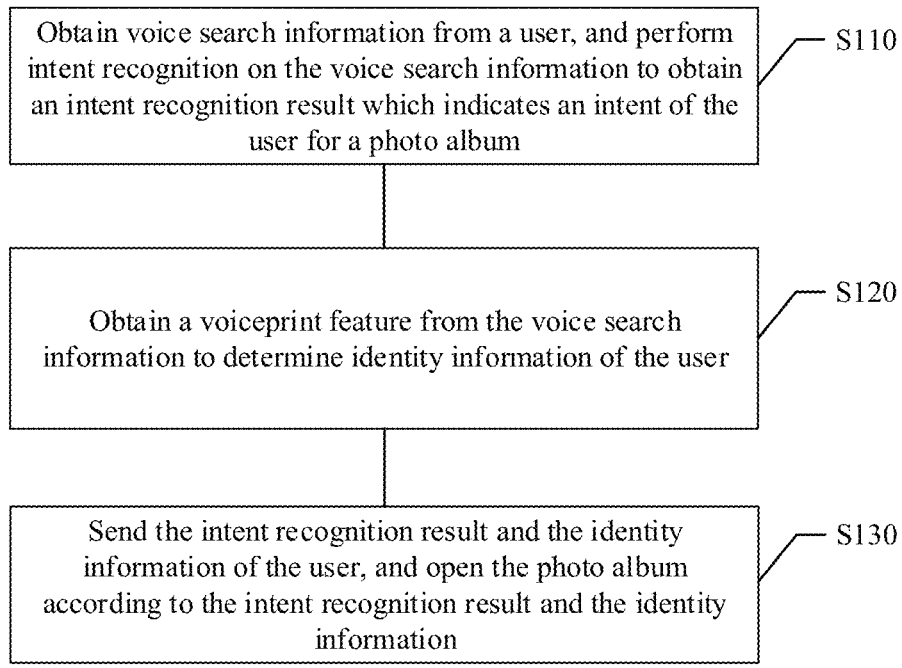
FIG. 1 schematically illustrates a flowchart of a photo album management method applied to a client according to an example embodiment of the present disclosure.

Example embodiments will now be described more fully with reference to the accompanying drawings. However, the embodiments can be implemented in a variety of forms and should not be construed as being limited to the examples set forth herein; rather, these embodiments are provided so that The present disclosure will be more complete so as to convey the idea of the example embodiments to those skilled in this art. The described features, structures, or characteristics in one or more embodiments may be combined in any suitable manner. In the following description, many specific details are provided to give a full understanding of the embodiments of the present disclosure. However, those skilled in the art will realize that the technical solutions of the present disclosure may be practiced with omitting one or more of the specific details, or other methods, components, devices, steps, etc. may be adopted. In other cases, well-known technical solutions are not shown or described in detail to avoid obscuring aspects of the present disclosure.

The terms "one," "a," "the," and "said" are used to indicate that there are one or more elements, components or the like. The terms "include," "contain," and "have" are used to indicate an open type meaning of including and means that there may be additional elements, components, etc. in addition to the listed elements/components/etc. The terms "first" and "second" are used to distinguish objects and not used for limiting the number of the objects.

In addition, the drawings are merely schematic illustrations of the present disclosure and are not necessarily drawn to scale. The same reference numerals in the drawings represent the same or similar parts, and thus repeated descriptions thereof will be omitted. Some block diagrams shown in the drawings are functional entities and do not necessarily have to correspond to physically or logically independent entities.

In view of the problems existing in the related art, the present disclosure proposes a photo album management method applied to a client. FIG. 1 shows a flowchart of the photo album management method. As shown in FIG. 1, the photo album management method includes at least the following steps:

In step S110, voice search information from a user is obtained, and intent recognition is performed on the voice search information to obtain an intent recognition result which indicates an intent of the user for a photo album.

In step S120, a voiceprint feature is obtained from the voice search information to determine identity information of the user.

In step S130, the intent recognition result and the identity information of the user are sent, and opening the photo album is opened according to the intent recognition result and the identity information.

In the example embodiment of the present disclosure, through voiceprint recognition technology, a function of making personalized responses can be implemented. On one hand, a speech device can be used to confirm the identity of a user when the speech device interacts with the user, ensure the security of use, and provide personalized services for different users. On the other hand, the example embodiment improves the accuracy of voice search results, simplifies user operations, saves operation time, and improves user operation efficiency.

Each step of the photo album management method will be described in detail below.

In step S110, voice search information from a user is obtained, and intent recognition is performed on the voice search information to obtain an intent recognition result which indicates an intent of the user for a photo album.

In an example embodiment of the present disclosure, the voice search information may be a voice which is output by a user to a voice search device and includes a search request of the user when the user uses the voice search device.

According to embodiments, the photo album may be a photo album including images of one or more users, for example, a family photo album, an album of a group, and the user who outputs the voice search information may be a family member or a group member.

Figure 2:
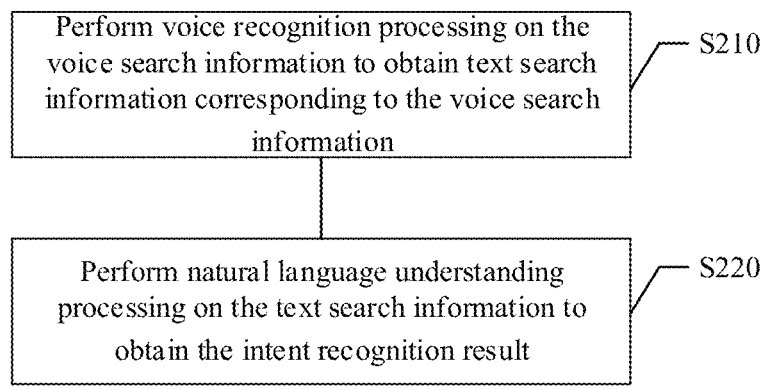
FIG. 2 schematically illustrates a flowchart of a method for performing intent recognition on voice search information according to an example embodiment of the present disclosure.

FIG. 2 schematically illustrates a flowchart of a method for performing intent recognition on voice search information. As shown in FIG. 2, the method includes at least the following steps:

In step S210, voice recognition processing is performed on the voice search information to obtain text search information corresponding to the voice search information.

A deep learning method may be used to perform voice recognition processing on the voice search information. For example, a voice recognition model is constructed using a convolutional neural network or a short-term memory network, and the voice search information is input to the voice recognition model. The voice recognition model can convert the voice search information to obtain text search information corresponding to the voice search information.

In step S220, natural language understanding processing is performed on the text search information to obtain the intent recognition result for the family photo album. Natural language comprehension processing can include preprocessing such as word segmentation and removal of stop words and so on, and natural language processing (NLU) technology is used to perform natural language processing on text search information. Specifically, after preprocessing the text search information, based on the part-of-speech analysis and syntactic analysis of the words in the text search information, a processing result of the natural language processing of the text search information may be determined. The processing result may be an ordered sequence of feature words corresponding to the text search information. The feature words may be words determined after preprocessing the text search information, and the ordered sequence may be determined according to the order of the feature words in the text search information, or the ordered sequence of feature words may be generated according to a standard grammar. Then, the ordered sequence is filled into a nested intent information structure, and an intent recognition result which indicates a user's intent on the family album can be obtained. The nested intent information structure can define specific fields in advance according to application scenarios, such as search intent categories, intent category information, historical behavior information, and so on.

In the example embodiment, by performing voice recognition processing and natural language understanding processing on the voice search information, the intent recognition result for the family album can be obtained, the needs of family members can be obtained more accurately, and accordingly accurate search can be performed, which improves the accuracy of search results.

In step S120, a voiceprint feature from the voice search information is obtained to determine identity information of the user.

In an example embodiment of the present disclosure, the voiceprint recognition technology is a biometric recognition technology that uses a voiceprint feature of a voice to authenticate a speaker. Everyone has specific voiceprint features, which are gradually formed by our vocal organs during growth. No matter how similar others imitate our speech, there are significant differences in voiceprint features. In practical applications, the classic Mel-Frequency Cepstrum (MFCC), Perceptual Linear Predictive (PLP), deep feature, and energy regularization spectral coefficients can be used as voiceprint feature. For example, MFCC can be used as the search voiceprint feature. Specifically, when extracting the search voiceprint features of the voice search information, the voice search information may be preprocessed to remove non-voice signals and silent signals, and then the preprocessed voice search information is framed to obtain the voice signal of each frame, and the MFCC of the voice signal of each frame is extracted, and the obtained MFCC is determined as the search voiceprint feature of the voice search information. In addition, the search voiceprint feature can also be obtained in other ways, which is not particularly limited in example embodiments of the present disclosure.

Figure 3:
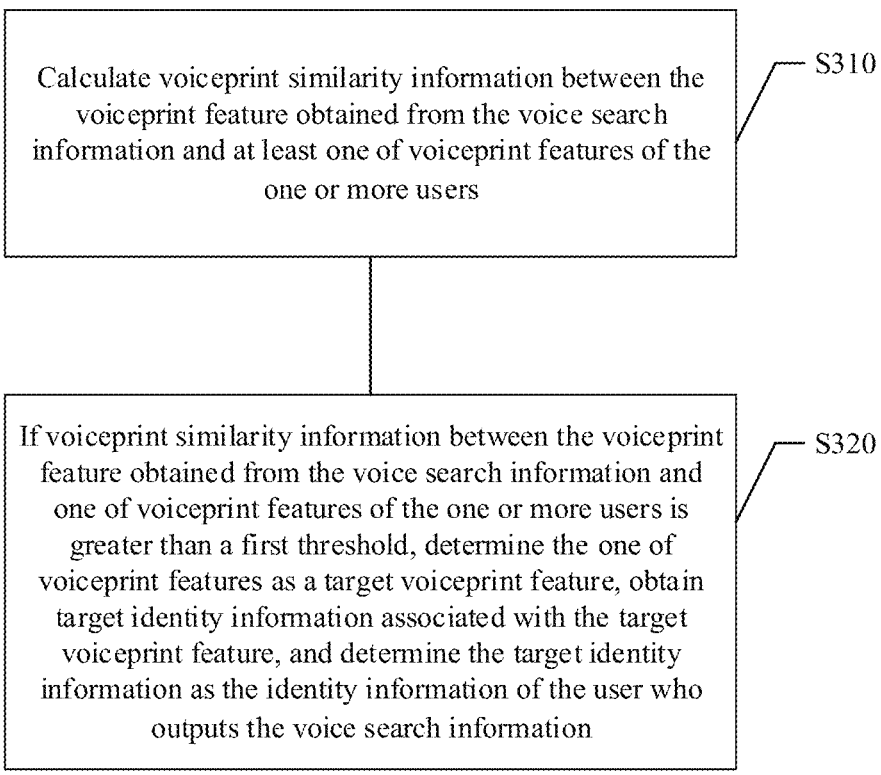
FIG. 3 schematically illustrates a flowchart of a method for determining identity information of a user according to an example embodiment of the present disclosure.

FIG. 3 schematically illustrates a flowchart of a method for determining identity information of a user who outputs the voice search information. As shown in FIG. 3, the method includes at least the following steps:

In step S310, voiceprint similarity information between the voiceprint feature obtained from the voice search information and at least one of voiceprint features of the one or more users is calculated.

For example, if the photo album is a family photo album, voiceprint feature information of a voice of a family member may be recorded when the family photo album is used by the family member for the first time. The voiceprint feature obtained from the voice search information is compared with at least one of voiceprint features of one or more family members. For example, a calculation may be performed according to the voiceprint feature obtained from the voice search information and at least one of voiceprint features of one or more family members to obtain corresponding voiceprint vectors and then, the similarity between the two vectors may be calculated using a cosine distance, a Chebyshev distance, a Markov distance, or other algorithms, and the calculation result is determined as the voiceprint similarity information.

In step S320, if voiceprint similarity information between the voiceprint feature obtained from the voice search information and one of voiceprint features of the one or more users is greater than a first threshold, the one of voiceprint features is determined as a target voiceprint feature, target identity information associated with the target voiceprint feature is obtained, and the target identity information is determined as the identity information of the user who outputs the voice search information.

The preset condition may be a determination condition for determining a family member corresponding to the search voiceprint feature. The voiceprint similarity information is used to indicate the similarity between the two voiceprint vectors. The smaller the voiceprint similarity information is, the less similar the search voiceprint feature is to the preset voiceprint feature. Conversely, larger the voiceprint similarity information is, the more similar the search voiceprint feature is to the preset voiceprint feature. The preset condition may require that the similarity is greater than a numerical threshold. If the voiceprint similarity is greater than the numerical threshold, it indicates that the voiceprint feature obtained from the voice search information matches the one voiceprint feature, and the one voiceprint feature is determined as the target voiceprint feature. Under such condition, the identity information associated with the target voiceprint feature can be obtained and determined as the identity information of the user who outputs the voice search information.

In the example embodiment, the search voiceprint feature is used to determine the identity of the user who outputs the voice search information, which can make full use of voice search information, improve the accuracy of search results, ensure the safe use of phone albums, and provide more accurate personalized services.

Figure 4:
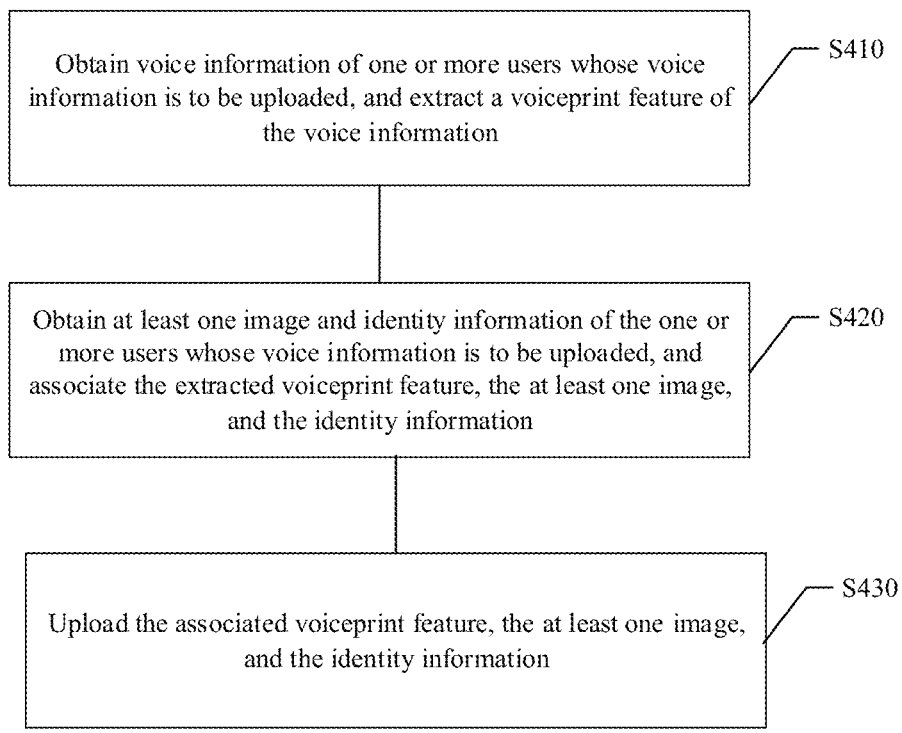
FIG. 4 is a schematic flowchart of a method for uploading data of family members according to an example embodiment of the present disclosure.

FIG. 4 is a schematic flowchart of a method for uploading data of users, for example, family members. As shown in FIG. 4, the method includes the following steps:

In step S410, voice information of one or more users whose voice information is to be uploaded is obtained, and a voiceprint feature of the voice information is extracted.

For example, when a family member uses the family photo album for the first time, the family member can read a short sentence as to-be-uploaded voice information of the member whose voice information is to be uploaded, and the to-be-uploaded voiceprint feature of the to-be-uploaded voice information is extracted. For example, MFCC can be used as the to-be-uploaded voiceprint feature. Specifically, when extracting the to-be-uploaded voiceprint feature of the to-be-uploaded voice information, the to-be-uploaded voice information may be preprocessed to remove non-voice signals and silent signals, and then the preprocessed voice information is framed to obtain the voice signal of each frame, the MFCC of the voice signal of each frame is extracted, and the obtained MFCC is determined as the to-be-uploaded voiceprint feature of the to-be-uploaded voice information. In addition, other methods for extracting voiceprint features may also be adopted, which is not specifically limited in example embodiments of the present disclosure.

In step S420, at least one image and identity information of the one or more users whose voice information is to be uploaded are obtained, and the extracted voiceprint feature, the at least one image, and the identity information are associated.

In addition to reading a voice to be uploaded, the member can also upload their own photos as the to-be-uploaded images. In addition, when the member appears for the first time, the position of the member in the family member structure chart may be designated as the to-be-uploaded identity information. In addition, for the member whose voice information is to be uploaded, the to-be-uploaded voiceprint feature, the at least one to-be-uploaded image, and the to-be-uploaded identity information may be associated to establish a mapping relationship between the three.

In step S430, the associated voiceprint feature, the at least one image, and the identity information are uploaded.

By uploading the associated to-be-uploaded voiceprint feature, the at least one to-be-uploaded image, and the to-be-uploaded identity information, users such as family members can use the photo album in the future.

In an example embodiment, a one-to-one correspondence between voiceprint features, images, and identity information of members in the family is established and the correspondence can be used as a basis for personalized display.

In step S130, the intent recognition result and the identity information of the user are sent, and the photo album is opened according to the intent recognition result and the identity information.

In the example embodiment of the present disclosure, according to the obtained identity information of the user who outputs the voice search information, the user's right to use the photo album can be determined, and according to the determined intent recognition result, the photo album can be opened for subsequent personalized services.

Figure 5:
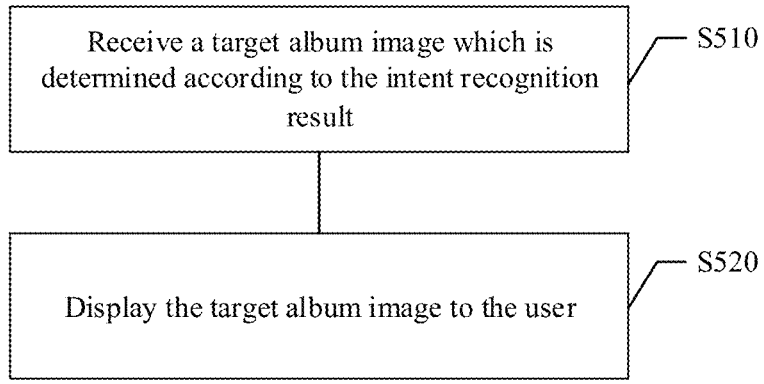
FIG. 5 is a schematic flowchart of a method for displaying a target image according to an example embodiment of the present disclosure.

FIG. 5 is a schematic flowchart of a method for displaying a target image. As shown in FIG. 5, the method includes at least the following steps:

In step S510, a target album image which is determined according to the intent recognition result is received.

The target album image may be an image of a target user to be viewed. According to an embodiment, the target album image includes an album image having a target face attribute. For example, the target album image may be a picture of a younger sister, and the target album image with the target attribute may be a picture in which the younger sister has long hair. In addition, other target album images and target album images with target attributes may be received, which are not specifically limited in example embodiments of the present disclosure.

In step S520, the target album image is displayed to the user who outputs the voice search information.

After receiving the target album image or the target album image with the target attribute, the target album image or the target album image with the target attribute may be displayed in the family photo album to meet the viewing needs of the family member who initiates the search request.

In the example embodiment, for the voice search information of the family member who initiates the search request, the target album image or the target album image with the target attribute may be displayed, so as to provide personalized display according to different family members and intents.

Figure 6:
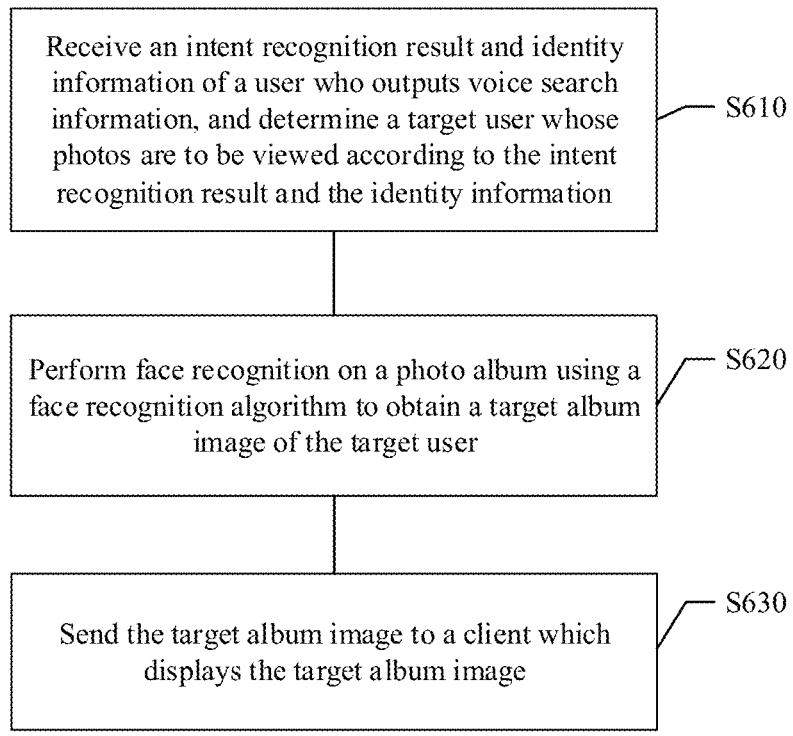
FIG. 6 schematically illustrates a flowchart of a photo album management method applied to a server side according to an example embodiment of the present disclosure.

In view of the problems existing in the related art, the present disclosure also proposes a photo album management method applied to a server side or, in other words, executed in a server remote from a client device. FIG. 6 shows a schematic flowchart of the photo album management method. As shown in FIG. 6, the photo album management method includes at least the following steps:

In step S610, an intent recognition result and identity information of a user who outputs voice search information are received, and a target user whose photos are to be viewed is determined according to the intent recognition result and the identity information.

In step S620, face recognition is performed on a photo album using a face recognition algorithm to obtain a target album image of the target user.

In step S630, the target album image is sent to a client which displays the target album image.

In the example embodiment of the present disclosure, the function of making a personalized response for different users such as family members can be realized through the face recognition technology. On one hand, the embodiment can simplify user operations, save operation time, and improve the efficiency and accuracy of user operations. On the other hand, according to the intent of searcher member and the face recognition technology, the target album image is determined to achieve a personalized response in this scenario.

Each step of the photo album management method is described in detail below.

In step S610, an intent recognition result and identity information of a user who outputs voice search information are received, and a target user whose photos are to be viewed is determined according to the intent recognition result and the identity information.

In an example embodiment of the present disclosure, for example, if the voice search information of the family member who initiates the search is "I want to see pictures of my younger sister," it can be determined that the target family member whose photos are to be viewed is the younger sister according to the intent recognition result for the voice search information and the identity information of the searcher member.

In step S620, face recognition is performed on a photo album using a face recognition algorithm to obtain a target album image of the target user.

In an example embodiment of the present disclosure, face recognition is a type of biometric recognition technology that determines identity of a user based on facial feature information of the user. The face recognition involves in a series of related technologies, including capturing images or video streams containing a human face by a video camera or a camera, automatically detecting images and performing face recognition according to the detected human face. The face recognition technology is also called as facial recognition or portrait recognition. Face recognition algorithms can include recognition algorithms based on facial feature points, recognition algorithms based on entire face images, recognition algorithms based on templates, and algorithms using neural networks for recognition. The face recognition algorithm can be used to perform face recognition on all the uploaded images in the family photo album to determine the target album image containing the target family members.

In step S630, the target album image is sent to a client which displays the target album image.

In an example embodiment of the present disclosure, the determined target album image may be sent to a client as feedback information for the user who initiates the search request.

Figure 7:
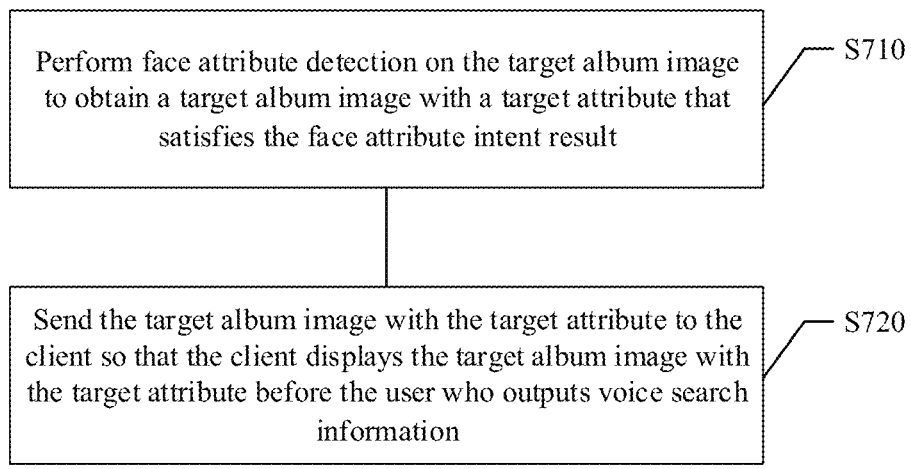
FIG. 7 is a schematic flowchart of a method for sending a target album image with a target attribute according to an example embodiment of the present disclosure.

In an example embodiment, the intent recognition result includes a face attribute intent result which is about an intent on a face attribute. FIG. 7 is a schematic flowchart of a method for sending a target album image with a target attribute. As shown in FIG. 7, the method includes at least the following steps:

In step S710, face attribute detection is performed on the target album image to obtain a target album image with a target attribute that satisfies the face attribute intent result.

Figure 8:
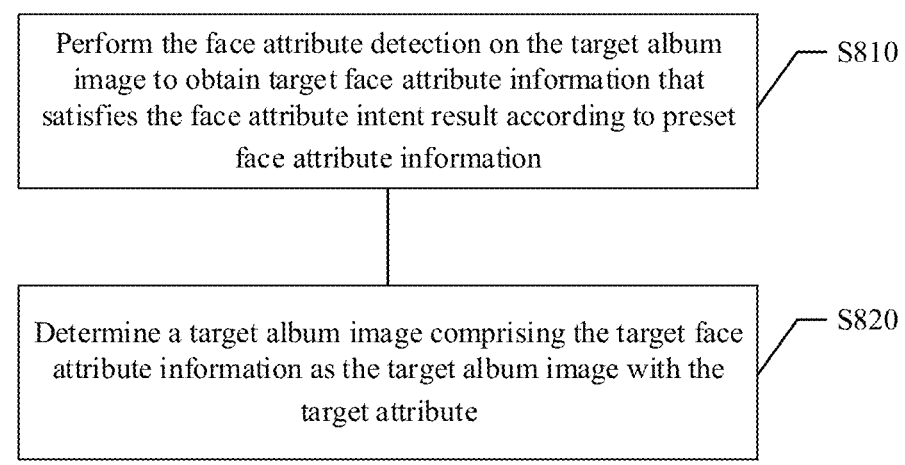
FIG. 8 is a schematic flowchart of a method for determining a target album image with a target attribute according to an example embodiment of the present disclosure.

FIG. 8 is a schematic flowchart of a method for determining a target album image with a target attribute. As shown in FIG. 8, the method includes at least the following steps:

In step S810, the face attribute detection is performed on the target album image to obtain target face attribute information that satisfies the face attribute intent result according to preset face attribute information. For example, the face attribute detection may include head pose detection, gender and age detection corresponding to the face, emotion detection of the face, and facial value score detection of the face, which are not specifically limited in example embodiments of the present disclosure. Detecting the face attributes on the determined target album image may include detecting the head orientation angle, age, gender, emotion, and face score of the person in the target album image. In addition, a convolutional neural network model corresponding to the face attribute can be used to detect the face attributes of the target album image. In addition, other face attribute detection algorithms may also be used, which is not particularly limited in example embodiments of the present disclosure.

In an example embodiment, the preset face attribute information includes preset head attribute information, preset face age information, preset face score information, and preset facial emotion information. The preset head attribute information may be the head orientation of the member, such as looking down, raising the head, and so on. The preset face age information may be a person's face age value. The preset face score information may be a score value indicating how beautiful a person is. The preset facial emotion information may be facial emotion information of a person, such as happy, sad, and so on. Example embodiments of the present disclosure do not impose specific limitations on this.

Based on the preset face attribute information, target face attribute information that satisfies the intent result of the face attribute can be obtained according to the result of the face attribute detection. For example, the target face attribute information can be "big cry," "5 years old" plus "big cry," or other target face attribute information, or other number of pieces of target face attribute information. Example embodiments of the present disclosure do not impose specific limitations on this.

In step S820, a target album image including the target face attribute information is determined as the target album image with the target attribute. The target album image containing the target face attribute information is determined as the target album image with the target attribute, that is, the target album image with the target attribute that satisfies the face attribute intent result is found.

In this example embodiment, the target album image with the target attribute is determined according to the preset face attribute information, which reduces the operation process and saves the viewing time.

In step S720, the target album image with the target attribute is sent to feed the target album image with the target attribute back to the user who outputs the search voice search information. The determined the target album image with the target attribute can be sent to the client as feedback information for the family member who initiates the search request.

In this example embodiment, the face attribute analysis technology is used to increase the demand for viewing album images and to enrich the personalized response in viewing the album scenario.

Figure 9:
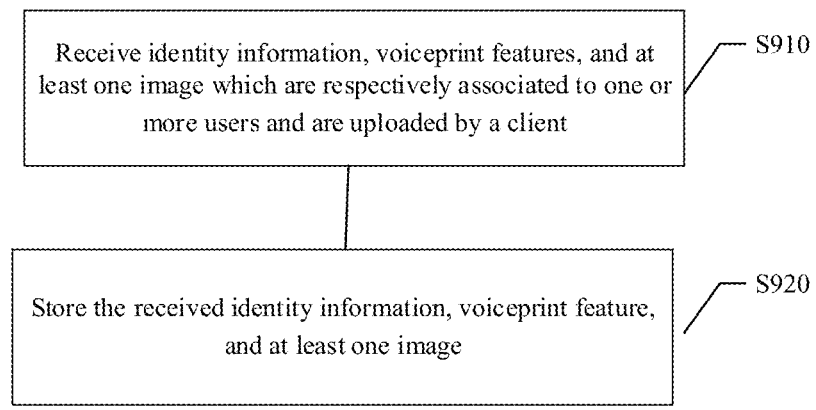
FIG. 9 is a schematic flowchart of a method for processing received data of a member whose data is to be uploaded according to an example embodiment of the present disclosure.

FIG. 9 is a schematic flowchart of a method for processing received data of a member whose data is to be uploaded. As shown in FIG. 9, the method includes at least the following steps:

In step S910, identity information, voiceprint features, and at least one image which are respectively associated to one or more users and are uploaded by a client are received.

When user such as a family member uses the photo album for the first time, the family member can read a short sentence as to-be-uploaded voice information of the member whose voice information is to be uploaded, and the to-be-uploaded voiceprint feature of the to-be-uploaded voice information is extracted. For example, MFCC can be used as the to-be-uploaded voiceprint feature, or other forms of voiceprint features may be uploaded, which is not specifically limited in this example embodiment. In addition to reading a voice to be uploaded, the member can also upload their own photos as the to-be-uploaded images. In addition, when the member appears for the first time, the position of the member in the family member structure chart may be designated as the to-be-uploaded identity information. In addition, for the member whose voice information is to be uploaded, the to-be-uploaded voiceprint feature, the at least one to-be-uploaded image, and the to-be-uploaded identity information may be associated to establish a mapping relationship between the three. The server can receive the associated to-be-uploaded identity information, to-be-uploaded voiceprint feature, and at least one to-be-uploaded image that are uploaded by the client.

In step S920, the received identity information, voiceprint feature, and at least one image are stored.

Figure 10:
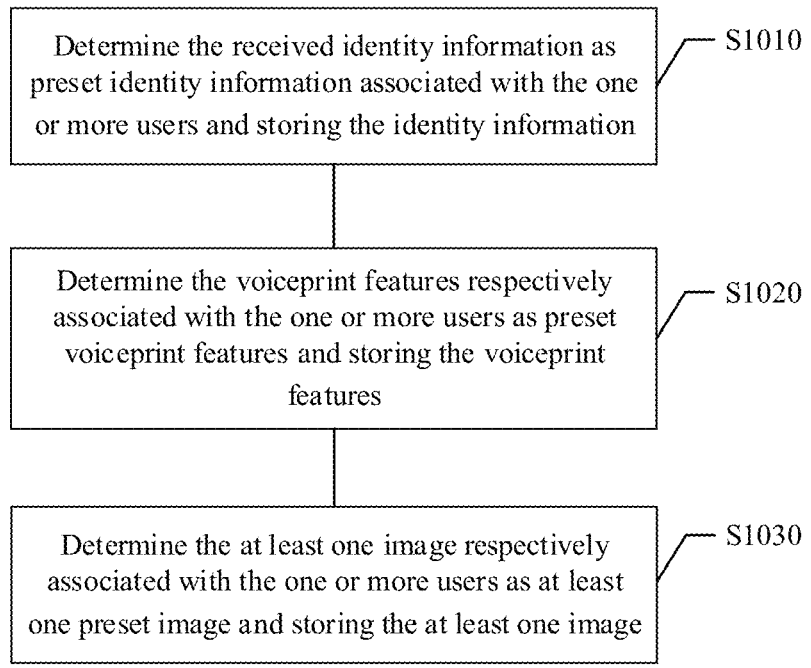
FIG. 10 is a schematic flowchart of a method for storing associated data according to an example embodiment of the present disclosure.

FIG. 10 is a schematic flowchart of a method for storing associated data. As shown in FIG. 10, the method includes at least the following steps:

In step S1010, the received identity information is determined as preset identity information associated with the one or more users and the identity information is stored. When uploading the identity information, the t identity information can be determined as preset identification information and stored, that is, the uploaded identity information is saved on the server side.

In step S1020, the voiceprint features respectively associated with the one or more users are determined as preset voiceprint features and the voiceprint features are stored. When uploading the voiceprint features, voiceprint features can be determined as preset voiceprint features and stored, that is, the uploaded voiceprint features are saved on the server side.

In step S1030, the at least one image respectively associated with the one or more users are determined as at least one preset image and the at least one image is stored.

Figure 11:
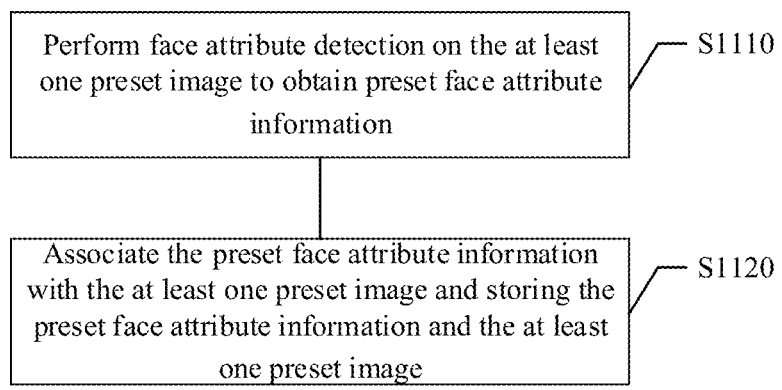
FIG. 11 is a schematic flowchart of a method for storing preset images according to an example embodiment of the present disclosure.

FIG. 11 is a schematic flowchart of a method for storing preset images. As shown in FIG. 11, the method includes at least the following steps:

In step S1110, face attribute detection is performed on the at least one preset image to obtain preset face attribute information. For example, the face attribute detection may include head pose detection, gender and age detection corresponding to the face, emotion detection of the face, and facial value score detection of the face, which are not specifically limited in example embodiments of the present disclosure. Detecting the face attributes on the preset image may include detecting the head orientation angle, age, gender, emotion, and face score of the person in the preset image. In addition, a convolutional neural network (CNN) model corresponding to the face attribute can be used to detect the face attributes of the target album image. In addition, other face attribute detection algorithms may also be used, which is not particularly limited in example embodiments of the present disclosure.

In addition, the preset face attribute information includes preset head attribute information, preset face age information, preset face score information, and preset facial emotion information. The preset head attribute information may be the head orientation of the member, such as looking down, raising the head, and so on. The preset face age information may be a person's face age value. The preset face score information may be a score value indicating how beautiful a person is. The preset facial emotion information may be facial emotion information of a person, such as happy, sad, and so on. Example embodiments of the present disclosure do not impose specific limitations on this.

In step S1120, the preset face attribute information is associated with the at least one preset image and the preset face attribute information and the at least one preset image are stored. In order to make family members easily find target face attribute information through preset face attribute information and further determine the target album image, a mapping relationship between the preset face attribute information and the preset image may be established, and then the preset face attribute information and the preset image may be stored.

In this example embodiment, the face attribute information is further obtained in the image to be uploaded, the stored data is enriched, and more diverse options are provided for satisfying search needs.

Figure 12:
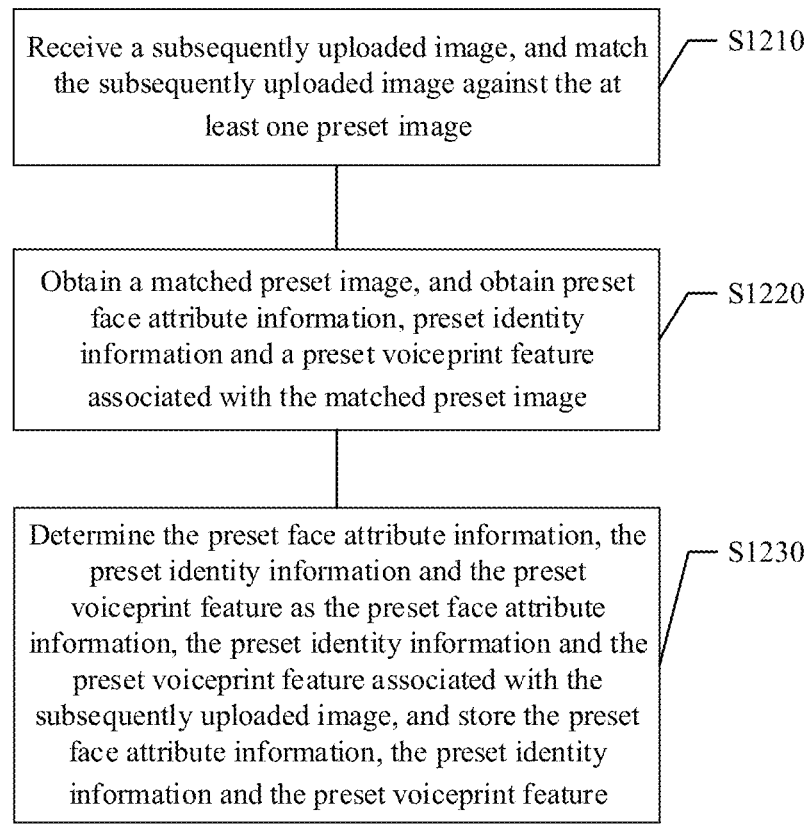
FIG. 12 is a schematic flowchart of a method in which data is not stored for the first time according to an example embodiment of the present disclosure.

FIG. 12 is a schematic flowchart of a method in which data is not stored for the first time. As shown in FIG. 12, the method includes at least the following steps:

In step S1210, a subsequently uploaded image is received, and the subsequently uploaded image is matched against the at least one preset image. When a family member wants to upload new photos in the family photo album, the subsequently uploaded images may be matched against preset images. For example, the specific matching method may be that the family member interacts with the family photo album to achieve the matching and management of family photo, or other matching methods may be used, which are not specifically limited in this example embodiment.

In step S1220, a matched preset image is obtained, and preset face attribute information, preset identity information and preset voiceprint feature associated with the matched preset image are obtained. According to the determined preset image, the corresponding preset face attribute information, preset identity information and preset voiceprint feature can be obtained according to the association relationship between the preset image, preset face attribute information, preset identity information and preset voiceprint feature.

In step S1230, the preset face attribute information, the preset identity information and the preset voiceprint feature are determined as the preset face attribute information, the preset identity information and the preset voiceprint feature associated with the subsequently uploaded image, and the preset face attribute information, the preset identity information and the preset voiceprint feature are stored. By associating the obtained corresponding preset face attribute information, the preset identity information and the preset voiceprint feature with the subsequently uploaded image, the preset face attribute information, the preset identity information, and the preset voiceprint feature can be used as the face attribute information, identity information, and voiceprint feature of the subsequently uploaded image, and such information is stored in the server side.

In this example embodiment, based on the stored preset data, associated data and information are automatically generated for subsequently uploaded images, which simplifies the upload process, saves manpower and time, and improves the user experience.

The photo album management methods in embodiments of the present disclosure will be described below in detail with reference to an application scenario.

Figure 13:
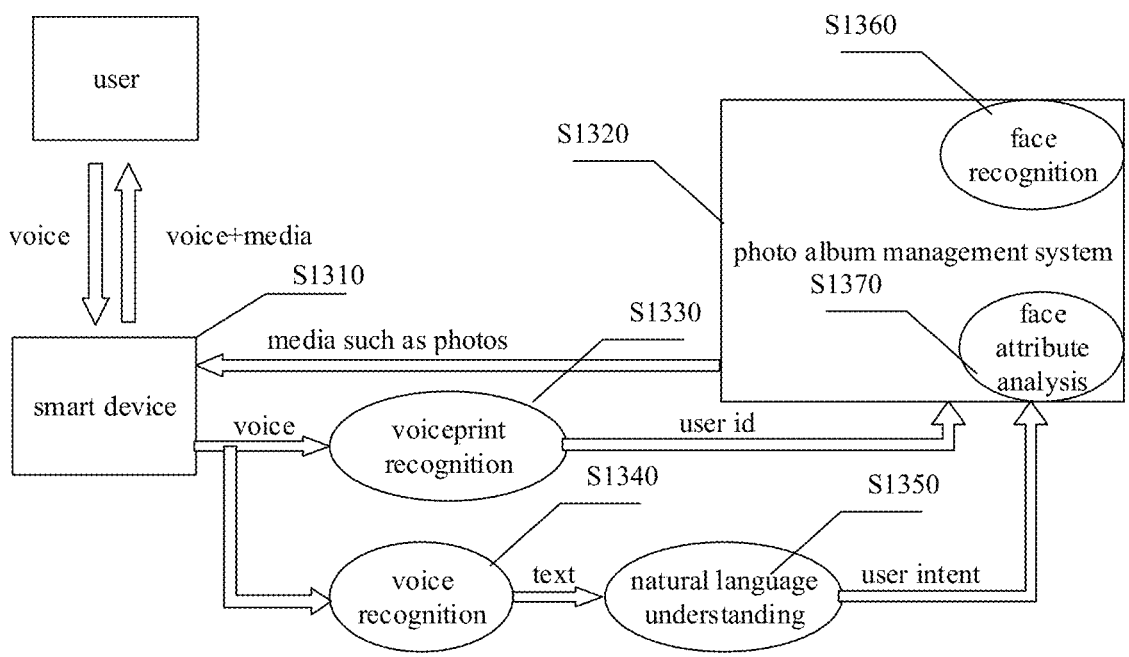
FIG. 13 schematically illustrates a flowchart of a photo album management method in an application scenario according to an example embodiment of the present disclosure.

FIG. 13 shows a system structure diagram associated with a photo album management method in an application scenario. As shown in FIG. 13, the system may include a smart terminal 1310, a photo album management system 1320, and various algorithm modules.

The smart terminal 1310 can directly interact with a user, including collection of control signals such as voice. For example, the smart terminal may be a smart electronic photo album, a smart picture screen, a smart TV, or a smart speaker.

The photo album management system 1320 is deployed on the server side, and includes a face recognition algorithm module, a face attribute analysis algorithm module, and a family member relationship structure storage module of the user's family.

Each algorithm module is used to support the data transmission in the system. The voiceprint recognition module 1330 can analyze which family member the voice belongs to. That is, by inputting the voice signal including the voice search information, the identity information of the searcher member can be output.

The voice recognition module 1340 can convert voice information into text information. That is, if voice information including voice search information, corresponding text search information can be output.

The natural language comprehension module 1350 can understand the intents of family members. That is, if text search information after voice recognition is performed is input, the intent recognition results for the family members can be output.

The face recognition algorithm module 1360 is deployed in the photo album management system, and when the photos of family members are input, the identity information corresponding to each face in the photos is output.

The face attribute analysis algorithm module 1370 is also deployed in the photo album management system. When a user's photo is input, corresponding face attribute information can be output.

Figure 14:
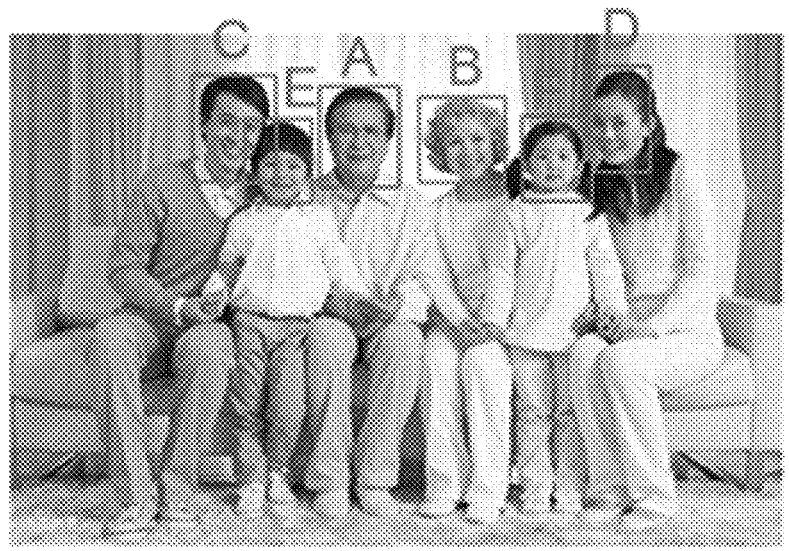
FIG. 14 schematically illustrates storing of family member relationships performed by a photo album management system according to an example embodiment of the present disclosure.

FIG. 14 schematically illustrates storing of family member relationships performed by a photo album management system. As shown in FIG. 14, the label for grandpa is A, i.e., A: {age: 65; face score: 66; long hair: 0; glasses: 1}. The number 0 indicates that the family member does not have the face attribute information, and 1 indicates that the family member has the face attribute information. It can be seen that in this photo, grandpa is 65 years old, has a face score of 66 points, has short hair and wears glasses. Similarly, the label for the grandma is B, i.e., B: {age: 63; face score: 79; long hair: 0; glasses: 0}. It can be seen that in this photo, the grandmother is 63 years old, the face score is 79 points, the grandmother has short hair and wears no glasses. The label for dad is C: {age: 37; face score: 77; long hair: 0; glasses: 0}. It can be seen that in this photo, dad is 37 years old, his face score is 77 points, he has short hair and does not wear glasses. The label for mom is D: {age: 37; face score: 83; long hair: 1; glasses: 0}. It can be seen that in this photo, the mother is 37 years old, the face score is 83 points, she has long hair and wears no glasses. The label for the son is E: {age: 6; face score: 51; long hair: 0; glasses: 0}. It can be seen that in this photo, the son is 6 years old, the face score is 51 points, he has short hair and no glasses. The label for the daughter is F: {age: 4; face score: 71; long hair: 1; glasses: 0}. It can be seen that in this photo, the daughter is 4 years old, the face score is 71, and she has long hair and wears no glasses.

Figure 15:
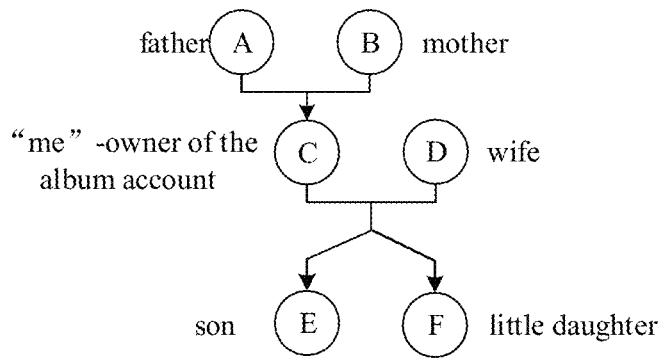
FIG. 15 schematically illustrates a structure of a stored family member relationship according to an example embodiment of the present disclosure.

FIG. 15 schematically illustrates a structure of family member relationship stored in a photo management system. As shown in FIG. 15, C is the account owner of the family album, A and B are the father and mother of the account owner, D is the owner's wife, E and F are the son and daughter of the family photo album owner, respectively.

According to the schematic diagram of the relationship structure of the family members, if the voice search information "I want to see pictures of my sister as a child" is initiated, the identity information of the searcher member can be determined based on voiceprint recognition technology, and voice recognition technology and natural language understanding processing technology may be used to determine the intent recognition result for the family member.

Then, a target album image is determined from the family photo album and fed back to the family member who initiates the voice search request.

In the example embodiment of the present disclosure, through the combination of voiceprint recognition technology and face recognition technology, the function of making personalized responses for different family members can be implemented. On one hand, the speech device can be used to confirm the identity of the user when interacting with the user, ensure the security of use, and provide personalized services for different users; on the other hand, the target album image is determined based on the intent of the search members and face recognition technology to achieve personalized response in this scenario.

It should be noted that although steps in the above example embodiments are described in a specific order, this does not require or imply that these steps must be performed in this specific order, or all steps must be performed to achieve the desired result. Additionally or alternatively, certain steps may be omitted, multiple steps may be combined into one step, and/or one step may be split into multiple steps, and so on.

Furthermore, although the various steps of the method of the present disclosure are described in a particular order in the drawings, this does not require or imply that the steps must be performed in that particular order or that all of the steps shown must be performed to achieve the desired result. Additionally or alternatively, certain steps may be omitted, multiple steps may be combined into one step, and/or one step may be split into multiple steps, and so on.

Through the description of the above-described embodiments, those skilled in the art can easily understand that the example embodiments described herein can be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, etc.) or on a network, and may include instructions to enable a computing device (which may be a personal computer, a server, a mobile terminal, or a network device, etc.) to execute the methods according to embodiments of the present disclosure.

In addition, in an example embodiment of the present disclosure, there is also provided an electronic device capable of implementing the above-described methods.

An electronic device 1600 according to an embodiment of the present disclosure is described below with reference to FIG. 16. The electronic device 1600 shown in FIG. 16 is merely an example, and should not be construed as imposing any limitation on the functions and scope of use of the embodiments of the present disclosure.

Figure 16:
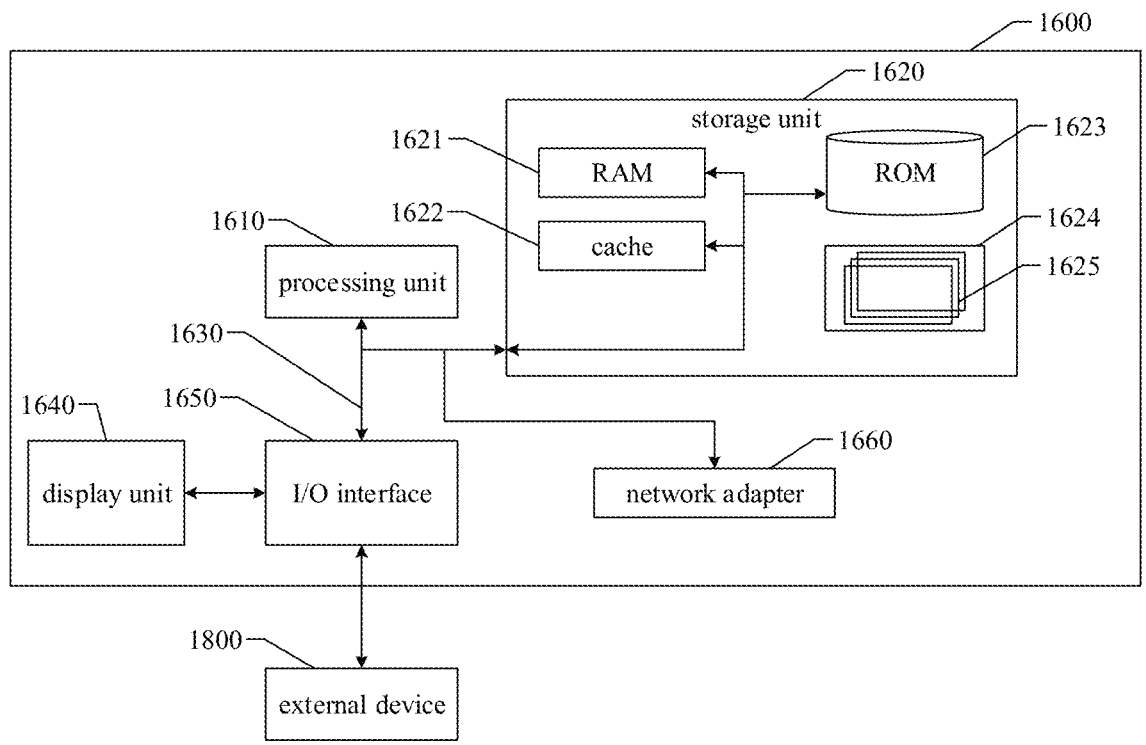
FIG. 16 schematically illustrates an electronic device for implementing a photo album management method according to an example embodiment of the present disclosure.

As shown in FIG. 16, the electronic device 1600 is in the form of a general-purpose computing device. The components of the electronic device 1600 may include, but are not limited to, at least one processing unit 1610, at least one storage unit 1620, a bus 1630 connecting different system components (including the storage unit 1620 and the processing unit 1610), and a display unit 1640.

The storage unit stores program codes, and the program codes can be executed by the processing unit 1610, so that the processing unit 1610 executes steps of various example embodiments of the present disclosure.

The storage unit 1620 may include a readable medium in the form of a volatile storage unit, such as a random access storage unit (RAM) 1621 and/or a cache storage unit 1622, and may further include a read-only storage unit (ROM) 1623.

The storage unit 1620 may also include a program/utility tool 1624 having a set (at least one) of program modules 1625. Such program modules 1625 include, but are not limited to, an operating system, one or more application programs, other program modules, and program data. Each or some combination of these examples may include an implementation of a network environment.

The bus 1630 may be one or more of several kinds of bus structures, including a memory unit bus or a memory unit controller, a peripheral bus, a graphics acceleration port, a processing unit, or a local area bus using any of a variety of bus structures.

The electronic device 1600 may also communicate with one or more external devices 1800 (such as a keyboard, pointing device, Bluetooth device, etc.), and may also communicate with one or more devices that enable a user to interact with the electronic device 1600, and/or with any device (e.g., router, modem, etc.) that enables the electronic device 1600 to communicate with one or more other computing devices. This communication can be performed through an input/output (I/O) interface 1650. Moreover, the electronic device 1600 can also communicate with one or more networks (such as a local area network (LAN), a wide area network (WAN), and/or a public network such as the Internet) through the network adapter 1660. As shown in this figure, the network adapter 1640 communicates with other modules of the electronic device 1600 through the bus 1630. It should be understood that although not shown in the figure, other hardware and/or software modules may be used in conjunction with the electronic device 1600, including but not limited to: microcode, device drivers, redundant processing units, external disk drive arrays, RAID systems, tape drives and data backup storage systems.

Through the description of the above-described embodiments, those skilled in the art can easily understand that the example embodiments described herein can be implemented by software, or by software in combination with necessary hardware. Therefore, the technical solution according to the embodiments of the present disclosure may be embodied in the form of a software product, which may be stored in a non-volatile storage medium (which may be a CD-ROM, a U disk, a mobile hard disk, etc.) or on a network, and may include instructions to cause a computing device (which may be a personal computer, a server, a terminal device, or a network device, etc.) to execute methods according to embodiments of the present disclosure.

In an example embodiment of the present disclosure, there is also provided a non-transitory computer-readable storage medium on which a program product capable of implementing the above-mentioned methods of the present specification is stored. In some possible embodiments, various aspects of the present disclosure may also be implemented in the form of a program product, which includes program codes. When the program products are run on a terminal device, the program codes are used to make the terminal device perform the steps according to various example embodiments of the present disclosure.

Figure 17:
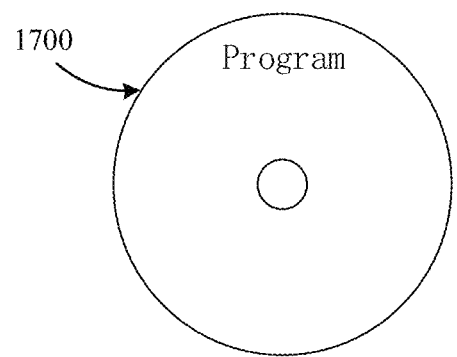
FIG. 17 schematically illustrates a non-transitory computer-readable storage medium for implementing a photo album management method according to an example embodiment of the present disclosure.

Referring to FIG. 17, a program product 1700 for implementing the above-described methods according to embodiments of the disclosure is described, which may adopt a portable compact disc read-only memory (CD-ROM) and include program codes. The program product may be stored in a terminal device and run on a personal computer. However, the program product of the present disclosure is not limited thereto. The readable storage medium may be any tangible medium containing or storing programs, and the programs may be used by an instruction execution system, apparatus, or device, or may be used in combination with an instruction execution system, apparatus, or device.

The program product may employ any combination of one or more readable mediums. The readable medium may be a non-transitory readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of the readable storage media include: an electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The non-transitory computer-readable signal medium may include a data signal in baseband or propagated as part of a carrier wave, in which a readable program code is carried. This propagated data signal can take many forms, including but not limited to electromagnetic signals, optical signals, or any suitable combination of the foregoing. The readable signal medium may also be any readable medium other than a readable storage medium, and the readable medium may send, transfer, or transmit a program for use by or in connection with an instruction execution system, apparatus, or device.

The program code contained on the readable storage medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages, which include object-oriented programming languages, such as Java, C++, etc. and also include conventional procedural programming language, such as "C" or a similar programming language. The program code can be executed entirely on the user computing device, partly on the user device, executed as an independent software package, executed partly on the user computing device and partly on the remote computing device, or executed entirely on the remote computing device or server. In the case of a remote computing device, the remote computing device can be connected to the user computing device through any kind of network, including a local area network (LAN) or a wide area network (WAN), or may be connected to an external computing device (for example, using an Internet service provider to connect through the Internet).

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope of the present disclosure is defined by the appended claims.

What is claimed is:

1. A photo album management method applied to a client, wherein the method comprises:
   obtaining voice search information from a user, and performing intent recognition on the voice search information to obtain an intent recognition result which indicates an intent of the user for a photo album;
   obtaining a voiceprint feature from the voice search information to determine identity information of the user; and
   sending the intent recognition result and the identity information of the user, and opening the photo album according to the intent recognition result and the identity information,
   wherein, before obtaining voice search information from the user, the method further comprises:
   obtaining voice information of one or more users whose voice information is to be uploaded, and extracting a voiceprint feature of the voice information;
   obtaining at least one image and identity information of the one or more users whose voice information is to be uploaded, and associating the extracted voiceprint feature, the at least one image, and the identity information; and
   uploading the associated voiceprint feature, the at least one image, and the identity information.

2. The photo album management method according to claim 1, wherein, after opening the photo album according to the intent recognition result and the identity information, the method further comprises:
   receiving a target album image which is determined according to the intent recognition result; and
   displaying the target album image to the user.

3. The photo album management method according to claim 2, wherein the target album image comprises an album image having a target face attribute.

4. The photo album management method according to claim 1, wherein performing intent recognition on the voice search information to obtain an intent recognition result, comprises:
   performing voice recognition processing on the voice search information to obtain text search information corresponding to the voice search information; and
   performing natural language understanding processing on the text search information to obtain the intent recognition result.

5. The photo album management method according to claim 1, wherein obtaining a voiceprint feature from the voice search information to determine identity information of the user, comprises:
   calculating voiceprint similarity information between the voiceprint feature obtained from the voice search information and at least one of voiceprint features of the one or more users; and
   if voiceprint similarity information between the voiceprint feature obtained from the voice search information and one of voiceprint features of the one or more users is greater than a first threshold, determining the one of voiceprint features as a target voiceprint feature, obtaining target identity information associated with the target voiceprint feature, and determining the target identity information as the identity information of the user who outputs the voice search information.

6. A photo album management method applied to a server, wherein the method comprises:
   receiving an intent recognition result and identity information of a user who outputs voice search information, and determining a target user whose photos are to be viewed according to the intent recognition result and the identity information;

performing face recognition on a photo album using a face recognition algorithm to obtain a target album image of the target user; and sending the target album image to a client which displays the target album image, wherein, before receiving the intent recognition result and the identity information of the user who outputs the voice search information, the method further comprises:

receiving identity information, voiceprint features, and at least one image which are respectively associated to one or more users and are uploaded by a client; and storing the received identity information, voiceprint feature, and at least one image.

7. The photo album management method according to claim 6, wherein:

the intent recognition result comprises a face attribute intent result which indicates what face attribute is desired; and the method further comprises:

performing face attribute detection on the target album image to obtain a target album image with a target attribute that satisfies the face attribute intent result; and sending the target album image with the target attribute to the client so that the client displays the target album image with the target attribute before the user who outputs voice search information.

8. The photo album management method according to claim 7, wherein performing face attribute detection on the target album image to obtain a target album image with a target attribute that satisfies the face attribute intent result comprises:

performing the face attribute detection on the target album image to obtain target face attribute information that satisfies the face attribute intent result according to preset face attribute information; and determining a target album image comprising the target face attribute information as the target album image with the target attribute.

9. The photo album management method according to claim 6, wherein storing the identity information, voiceprint feature, and at least one image comprises:

determining the received identity information as preset identity information associated with the one or more users and storing the identity information;

determining the voiceprint features respectively associated with the one or more users as preset voiceprint features and storing the voiceprint features; and determining the at least one image respectively associated with the one or more users as at least one preset image and storing the at least one image.

10. The photo album management method according to claim 9, wherein determining the at least one image respectively associated with the one or more family members as at least one preset image and storing the image comprises:

performing face attribute detection on the at least one preset image to obtain preset face attribute information; and associating the preset face attribute information with the at least one preset image and storing the preset face attribute information and the at least one preset image.

11. The photo album management method according to claim 10, wherein the preset face attribute information comprises: preset head attribute information, preset face age information, preset face score information, and preset facial emotion information.

12. The photo album management method according to claim 11, further comprising:

receiving a subsequently uploaded image, and matching the subsequently uploaded image against the at least one preset image;

obtaining a matched preset image, and obtaining preset face attribute information, preset identity information and a preset voiceprint feature associated with the matched preset image; and determining the preset face attribute information, the preset identity information and the preset voiceprint feature as the preset face attribute information, the preset identity information and the preset voiceprint feature associated with the subsequently uploaded image, and storing the preset face attribute information, the preset identity information and the preset voiceprint feature.

13. A non-transitory computer-readable storage medium having stored thereon a computer program, wherein, when the computer program is executed by at least one hardware processor, the photo album management method according to claim 1 is implemented.

14. An electronic device, comprising:

at least one hardware processor; and a memory for storing program instructions executable by the at least one hardware processor;

wherein the at least one hardware processor is configured to execute the photo album management method according to claim 1 by executing the program instructions.

* * * * *